Patented Nov. 14, 1922.

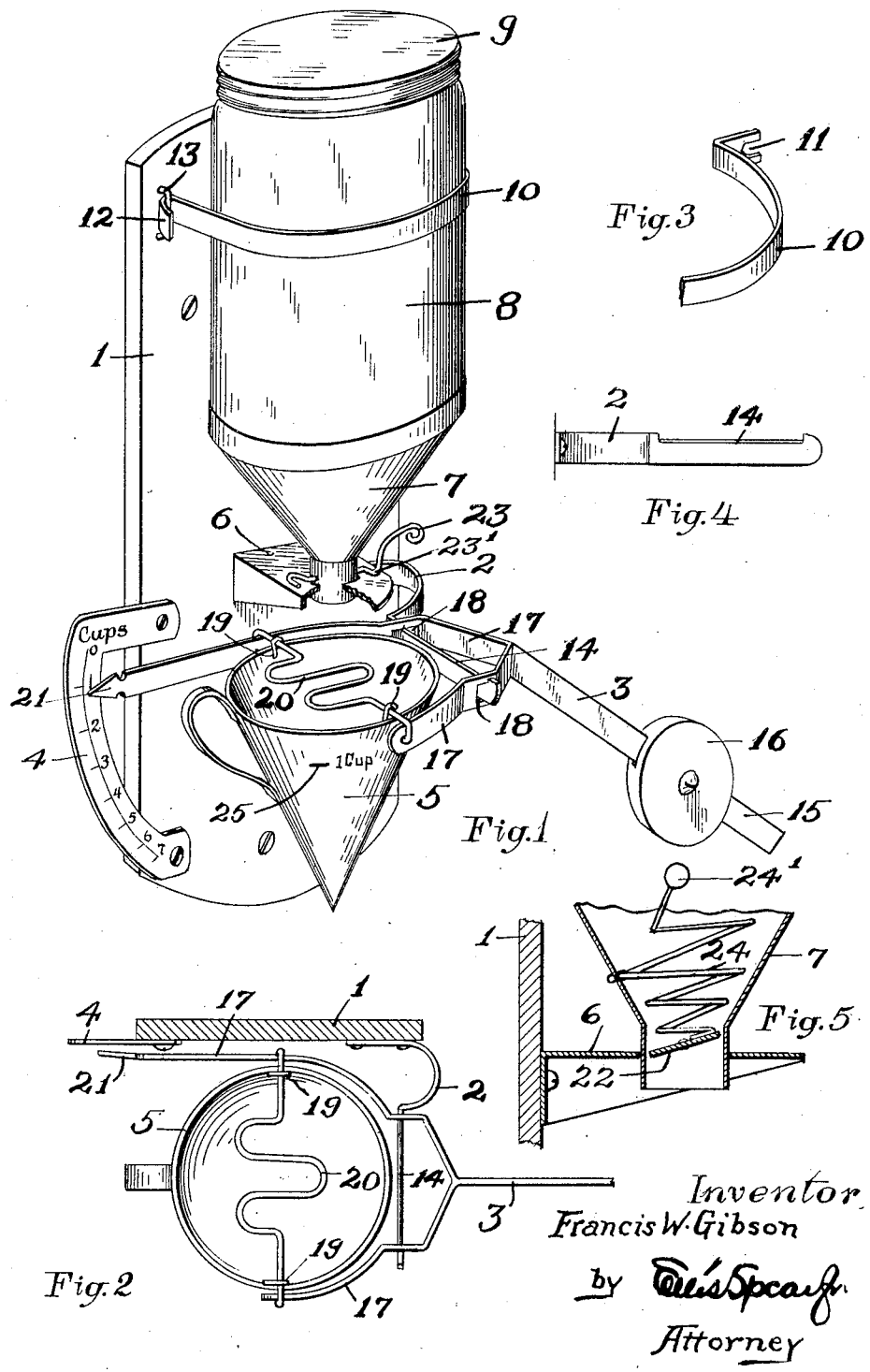

1,435,287

UNITED STATES PATENT OFFICE.

FRANCIS WINANS GIBSON, OF BOSTON, MASSACHUSETTS.

COFFEE MAKER.

Application filed April 26, 1918. Serial No. 230,966.

*To all whom it may concern:*

Be it known that I, FRANCIS W. GIBSON, a citizen of the United States, residing at West Roxbury, Boston, county of Suffolk, Commonwealth of Massachusetts, have invented certain new and useful Improvements in Coffee Makers, of which the following is a specification.

This invention relates to weighing apparatus suitable for household use in the proportioning of food ingredients, and is particularly intended for use in measuring the two principal ingredients, coffee and water, involved in the process of making coffee.

The object of my invention is to provide a simple, inexpensive and accurate device for measuring coffee and water, and in which the supply of coffee may be kept in sanitary condition and preserved against deterioration.

This object, together with certain other features of advantage, is secured in the device of the present invention, the construction and operation of which is disclosed in the specification which follows. In the drawings accompanying that specification, I have shown an embodiment of my invention which well illustrates the principles involved, and is in itself a form found satisfactory in use and well adapted to the requirements of manufacture. Throughout the specification and drawings, like reference characters are correspondingly employed, and in the drawings:

Fig. 1 is a perspective view of measuring apparatus in accordance with my invention.

Fig. 2 is a plan view of the scale mechanism, and illustrating the manner of attachment of the parts to the supporting structure.

Fig. 3 is a detail view of a portion of the container clamping band, removed.

Fig. 4 is a detail view of the knife edge member of the scale mechanism, removed.

Fig. 5 is a detail section through the discharge spout for the container, particularly illustrating the valve mechanism.

I have indicated at 1 a suitable base or attaching member upon which my measuring apparatus may be mounted. The member 1 may be fastened to a wall or other support whereby to dispose the apparatus in conveniently accessible position.

The container 8 for the coffee or other substance to be delivered and weighed, the scale mechanism 2 and 3, the indicator 4 and the measuring receptacle 5 may all be attached to the member 1 in any convenient manner.

As here shown, the container 8 is a jar, preferably of glass so as to visibly expose its contents, having a removable closure 9 for its filling opening, and having a discharge opening delivering by gravity into a discharge nozzle 7 which is supported upon a bracket 6 projecting horizontally from the member 1. The container 8 may conveniently be an original package having one end removable and insertable into the nozzle 7.

The container is detachably clamped near its upper end to the member 1 by a suitable clamping band 10. One end of this band may be outwardly turned and slotted, as indicated at 11 Fig. 3, for engagement with a screw or the like projecting from the base 1. The other end of the band 10 may be hooked as indicated at 12, Fig. 1, for engagement with a staple 13 projecting from said base 1. The lower end of the container seats within the discharge spout 7 upon a suitable shoulder formed internally thereof. The bracket 6 has an opening therein through which the restricted end of the funnel-shaped spout or nozzle 7 extends, as best shown in Figs. 1 and 5. The delivery at 7 may be direct to the scale member or may in case the coffee is supplied in the bean may deliver to an intermediate mill or grinder from which it passes to the weighing device which I shall now describe.

The scale mechanism, indicated generally by the numerals 2 and 3 carries the measuring receptacle 5, being suitably adjusted or counter-balanced to compensate for the weight of this receptacle when empty.

As here shown, the member 2 is a simple metallic strip fastened at one end to the support 1, as clearly shown in Fig. 2, and formed with a horizontally extending knife edge 14 upon which the member 3 is adapted to rock.

The member 3, as here shown, is formed as a simple metallic strip, comprising a balancing portion 15 upon which a counterweight 16 is adjustably mounted, and a pair of forked arms 17, which are slotted as indicated at 18 and formed to fit the knife edge 14.

The arms 17 support the measuring receptacle 5, which may be detachably suspended therefrom in any suitable manner. As here shown, said receptacle is provided with hooks 19 which engage over a horizontally disposed leveling device 20 extending across the top of the receptacle and fastened at its ends to the arms 17, as clearly appears in Fig. 1. The leveling device 20 may be suitably bent between its ends, as shown in Figs. 1 and 2, whereby to present an extended surface to the coffee or other substance discharging therepast into the receptacle to secure an even distribution in the receptacle 5.

The indicator 4 cooperates with the scale member being graduated to indicate in terms of cup the amount of coffee discharged into the measuring receptacle 5. A convenient margin is provided adjacent the graduations for individual indications where personal taste requires more or less coffee per cup. One of the receptacle-supporting arms 7 may conveniently be extended and formed as a pointer 21 to cooperate with the graduations of the indicator scale 4.

The discharge of coffee from the container 8 into the receptacle 5 is controlled by any suitable valve mechanism, which may be so regulated, if desired, that each actuation of the valve will deliver substantially enough coffee to make one cup. As here shown, the discharge is controlled by a gate valve 22 pivotally mounted within the restricted discharge end of the spout 7 (see Fig. 5) and operated by any suitable externally disposed handle 23. The valve handle 23 is provided with a turn 23¹ so disposed as to lie flat on the support 2 when the valve is closed. The weight of the container therefore tends to close the valve 22 and cut off the delivery of the coffee. Furthermore, the upward lift of the container assists in bringing down a free delivery.

In order to prevent the coffee from clogging at the valve, I provide a stirrer 24 which is adapted to be operated each time the valve is opened and closed, and which thus moves through the coffee and keeps it loose. This stirrer may conveniently be a simple coil of spring wire fastened at one end to the upper face of the gate valve in its movement. The stirrer 24 is preferably also continued upwardly and left with a free end 24¹ on which a vibrator is mounted to keep the contents free within the container.

It will be noted that the receptacle 5 is formed as a cup of conic shape. The purpose of this construction is to insure symmetrical distribution of the coffee in the receptacle especially relative to the pivot of the balance. It further prevents the use of the cup for any other purpose when it is removed from the supporting arms 17 for use as a liquid measure, as might happen if the receptacle could be set on its base, thus making its return to its proper place substantially certain. The liquid capacity of the receptacle 5 is graduated in relation to the weight unit of the scale as to give the proper volume of liquid unit for the weight unit.

In the use of my device, the container 8 filled with the coffee or other substance to be disposed is put in place. The receptacle 5 being hung in place, the balance 16 adjusted (if necessary) until the pointer 21 registers with the zero mark on the indicator 4. When the valve 22 is turned by the handle 23 a quantity of coffee descends by gravity into the receptacle 5, the reading being given in terms of cups by the movement of the pointer past the markings of the indicator 4.

When a quantity of coffee sufficient to make the desired number of cups is thus delivered, the valve 22 is again closed, and the receptacle 5 removed and the known quantity of coffee mixed with the proper amount of water.

If for example, enough coffee has been delivered into the receptacle 5 to make three cups of coffee, the measured coffee is emptied into the coffee pot or other receptacle, and the cup 5 three times filled substantially with water and emptied into the coffee pot. For practical reasons, of course, it is desirable that a water line 25 be marked on the receptacle 5 to indicate the level to which the receptacle shall be filled with water, rather than attempt to measure by filling to overflowing. With coffee of known grade and kind, and ground to a determined fineness, and to which the quantity of water per cup is related, it is possible by my apparatus to consistently achieve a satisfactory cup of coffee.

Various modifications in the form and construction of my device may obviously be resorted to if within the limits of the appended claims.

What I therefore claim and desire to secure by Letters Patent is:

1. In a device of the class described, a conical delivery nozzle, a balance arm pivoted adjacent to said delivery nozzle, a conical receiver suspended from said arm and alined with said delivery nozzle.

2. In a device of the class described, a containing member having a delivery nozzle at its bottom, a guide for said nozzle, a valve in said nozzle, a valve stem for said valve and having bearing engaging portions disposed and maintaining said valve closed and in contact with said support.

3. In a device of the class described, a containing member having a delivery nozzle at its bottom, a guide for said nozzle, a valve in said nozzle, a valve stem for said valve and having oppositely disposed bearing engaging portions disposed and maintaining said valve closed and in contact with said support.

4. In a device of the class described, a delivery nozzle, a rotatable valve for said nozzle, and an agitator mounted on said valve comprising a plurality of superimposed spaced agitators moving transversely of said delivery nozzle upon the operation of said valve.

5. In a device of the class described, a delivery nozzle, a substantially conical receiver disposed beneath said delivery nozzle, a pivoted mount for said receiver disposed adjacent to said delivery nozzle for movably supporting said receiver in a vertical arc beneath said delivery nozzle.

6. In a device of the class described, a delivery nozzle, a scale element, and a substantially conical closed bottom graduated measuring receptacle detachably associated with said scale element and alined with said nozzle.

7. In combination, a container having a controllable discharge opening, a weighing apparatus, and a pendent receptacle having a floating connection with said weighing apparatus whereby to automatically center itself below said discharge opening, said receptacle of conic shape.

8. In a device of the class described, a support, a container mounted vertically thereon having a restricted discharge opening, a valve controlling said opening, a horizontally disposed fulcrum extending from said support, a balance member fulcrumed on said fulcrum, and extending horizontally beneath said container, a pointer carried by said balance member, a fixed indicator cooperating with said pointer and graduated in terms of dry-measure units, and a receptacle detachably supported upon said balance member below said discharge opening of the container and having a liquid unit graduation.

9. In a device of the class described, a support, a container mounted vertically thereon having a restricted discharge opening, a valve controlling said opening, a horizontally disposed knife edge bearing extending from said support below the plane of said discharge opening, a balance member fulcrumed on said bearing and disposed transversely of said support, and having a pair of spaced receptacle supporting arms, a pointer carried by one of said arms, a fixed indicator cooperating with said pointer and graduated in terms of dry-measure units, and a receptacle detachably supported upon said arms below said discharge opening of the container and having a liquid unit graduation.

10. In a device of the class described, a support, a bracket extending horizontally therefrom, a vertically disposed container having a discharge spout set through said bracket and guided thereby, a valve in said discharge spout, and a valve handle having a flattened support contacting portion disposed to normally maintain said valve closed.

11. In a device of the class described, a delivery nozzle, a scale element, and a substantially conical closed bottom graduated measuring receptacle detachably mounted on said scale element for movement in a substantially vertical arc and alined with said nozzle.

12. In a device of the class described, a delivery nozzle, a knife edge, a forked balance member fulcruming on said knife edge beneath said nozzle, and a closed bottom graduated measuring receptable detachably suspended between the forks of said balance member and alined with said nozzle.

13. In a device of the class described, in combination, a container for a substance to be weighed, weighing apparatus, and a receptacle adapted to receive said substance as it discharges from the container and detachably suspended from said weighing apparatus, and a leveler associated with said receptacle and adapted to evenly distribute the substance discharged into said cup from the container.

14. In a scale, the combination with a balance member, of a closed bottom graduated measuring receptacle of substantially conical form, whereby the material emptied thereinto automatically centers itself, having a floating connection with said balance member.

15. In a scale, the combination with a balance member, or a pendent closed bottom graduated measuring receptacle of substantially conical form, whereby the material emptied thereinto automatically centers itself, detachably suspended from said balance member.

16. In a scale, the combination with a forked balance member, of a substantially conical closed bottom graduated measuring receptacle detachably suspended between the forks of said balance member.

17. In a scale, the combination with a knife edge, and a forked balance member fulcrumed thereon, of a substantially conical closed bottom graduated measuring receptacle detachably suspended between the forks of said balance member.

In testimony whereof I affix my signature in presence of two witnesses.

FRANCIS WINANS GIBSON.

Witnesses:
GEORGE B. RAWLINGS,
VICTORIA LOWDEN.